United States Patent
Ihata

(10) Patent No.: US 6,198,188 B1
(45) Date of Patent: Mar. 6, 2001

(54) RECTIFIER COOLING FIN ARRANGEMENT OF VEHICLE AC GENERATOR

(75) Inventor: Koichi Ihata, Okazaki (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/429,929

(22) Filed: Oct. 29, 1999

(30) Foreign Application Priority Data

Mar. 3, 1999 (JP) .................................................. 11-055505

(51) Int. Cl.⁷ ...................................................... H02K 9/28
(52) U.S. Cl. ........................................................ 310/68 D
(58) Field of Search .................................. 310/68 D, 89, 310/67 R, 91

(56) References Cited

U.S. PATENT DOCUMENTS

| | | | |
|---|---|---|---|
| 4,419,597 | 12/1983 | Shiga et al. ........................ | 310/68 D |
| 4,952,829 | * 8/1990 | Armbruster et al. ............... | 310/68 D |
| 5,013,948 | * 5/1991 | Tumpey et al. .................... | 310/68 D |

* cited by examiner

Primary Examiner—Burton Mullins
(74) Attorney, Agent, or Firm—Pillsbury Madison & Sutro LLP

(57) ABSTRACT

A vehicle AC generator includes a pair of front and rear frames fastened by a plurality of stud bolts at peripheral portions thereof, a stator having a multi-phase armature winding supported by the pair of frames, a rotor disposed radially inside the stator, a rectifier unit having a positive cooling fin holding a plurality of positive diodes, a connection member, and a negative cooling fin holding a plurality of negative diodes. The positive cooling fin is fastened by the plurality of stud bolts together with the pair of frames separate from the negative cooling fin, and the connection member is disposed between the positive cooling fin and the negative cooling fin. The connection member has a circuit for electrically connecting the armature winding and the rectifier unit, which is covered by an insulation member.

8 Claims, 7 Drawing Sheets

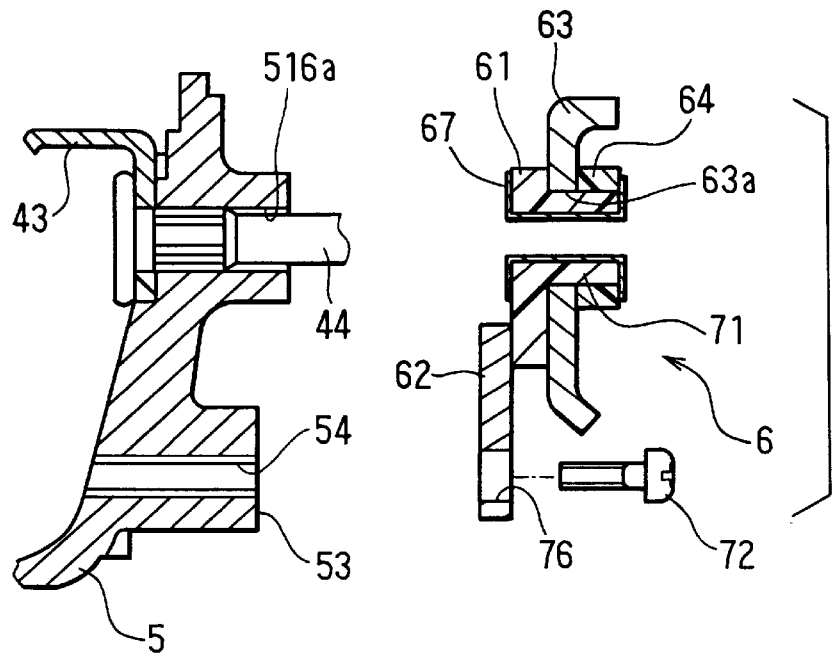
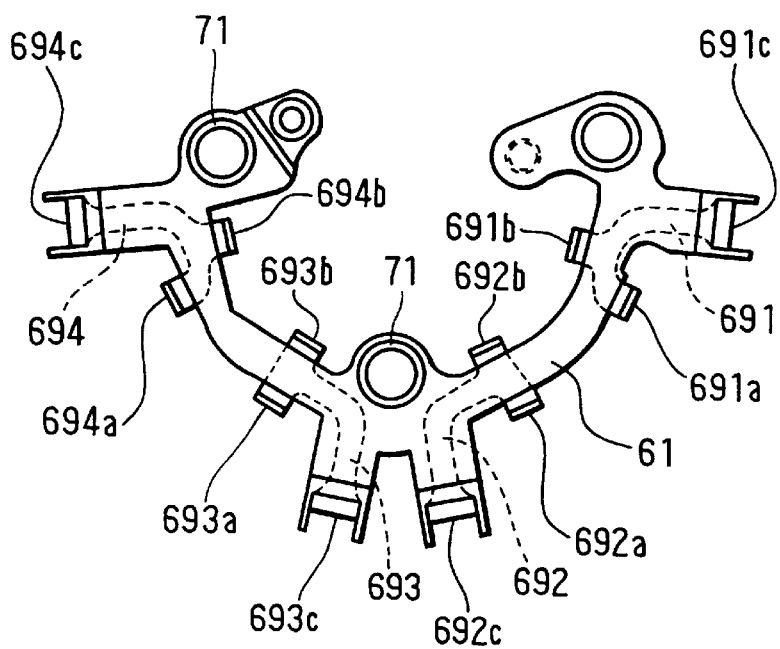

FIG.12A
FIG.12B
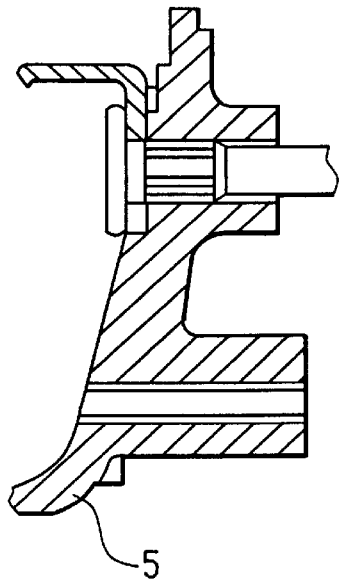
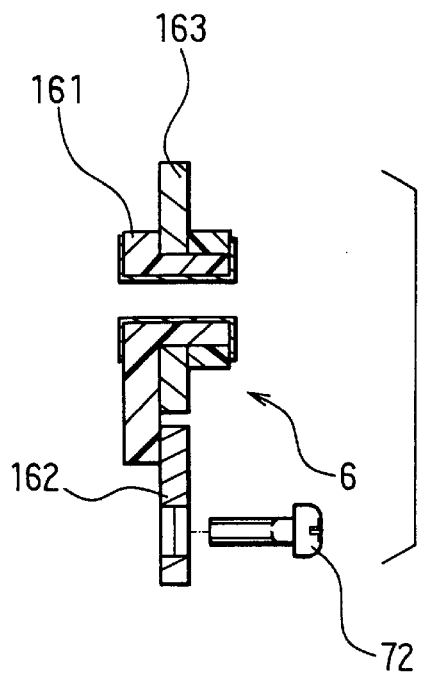
FIG.13A
FIG.13B
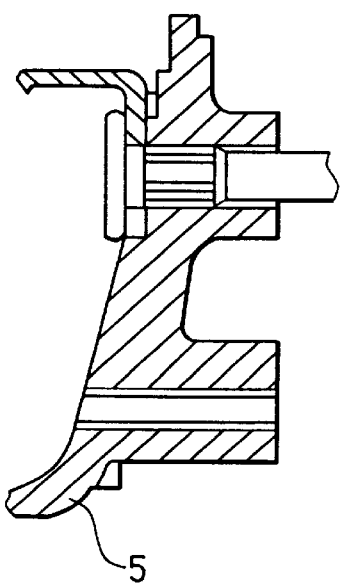
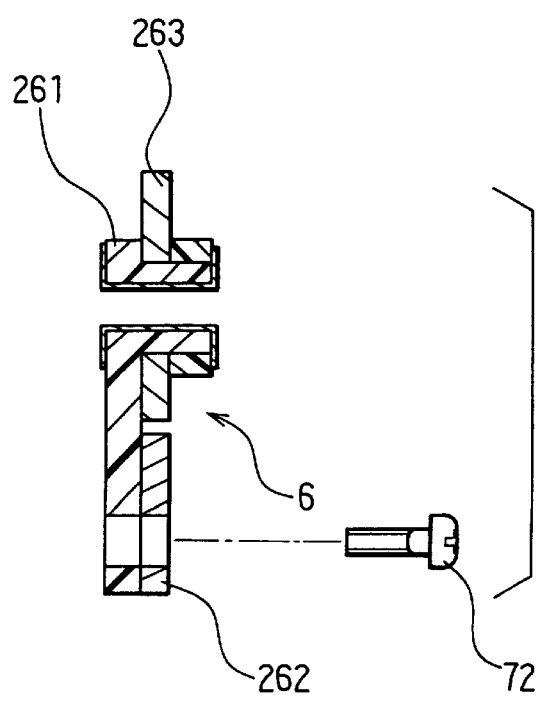

RECTIFIER COOLING FIN ARRANGEMENT OF VEHICLE AC GENERATOR

CROSS REFERENCE TO RELATED APPLICATION

The present application is based on and claims priority from Japanese Patent Application Hei 11-55505, filed on Mar. 3, 1999, the contents of which are incorporated herein by reference.

BACKGROUND OF THE INVENTION

1. Field of the Invention

The present invention relates to a rectifier cooling fin arrangement of a vehicle AC generator.

2. Description of the Related Art

U.S. Pat. No. 4,419,597 discloses a vehicle AC generator which has a positive and negative cooling fins for cooling a plurality of positive and negative diodes of a rectifier unit. The positive and negative cooling fins are fixed to portions of the frame around a bearing by stud bolts, and, accordingly, the heat of the diodes is conducted to the bearing.

As the output power of the AC generator increases, the heat of the diodes increases to thereby affect the life of the bearing.

SUMMARY OF THE INVENTION

A main object of the invention is to provide an improved vehicle AC generator that has a cooling arrangement to prevent the above problem.

Another object of the invention is to provide an improved rectifier unit that can be cooled effectively thereby to prevent temperature rise of a rotor supporting bearing.

According to a preferred embodiment of the invention, a vehicle AC generator includes a pair of front and rear frames fastened by a plurality of stud bolts at peripheral portions thereof, a stator having a multi-phase armature winding supported by the pair of frames, a rotor disposed inside the stator, a rectifier unit having a positive cooling fin, a negative cooling fin and a connection member. The positive cooling fin is fastened by the plurality of stud bolts together with the front and rear frames separate from the negative cooling fin, and the connection member is disposed between the positive cooling fin and the negative cooling fin to insulate and hold the positive and negative cooling fins. The negative cooling fin is preferably fastened to the rear frame by a plurality of stud bolts disposed at portions radially outer side of the positive cooling fin.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

FIGS. 3A and 3B are fragmentary enlarged cross-sectional views of a frame and a rectifier unit cut along line III—III in FIG. 2;

FIG. 4 is a schematic view of a connection member integrated with the rectifier unit;

FIGS. 12A and 12B are fragmentary enlarged corss-sectional views of a frame and a rectifier unit of a vehicle AC generator according to a second embodiment of the invention; and FIG. 13A and 13B are fragmentary enlarged cross-sectional views of a frame and a rectifier unit of a vehicle AC generator according to a third embodiment.

DETAILED DESCRIPTION OF THE PREFERRED EMBODIMENTS

A vehicle AC generator according to a first embodiment of the invention is described with reference to FIGS. 1–6.

Figure 1:
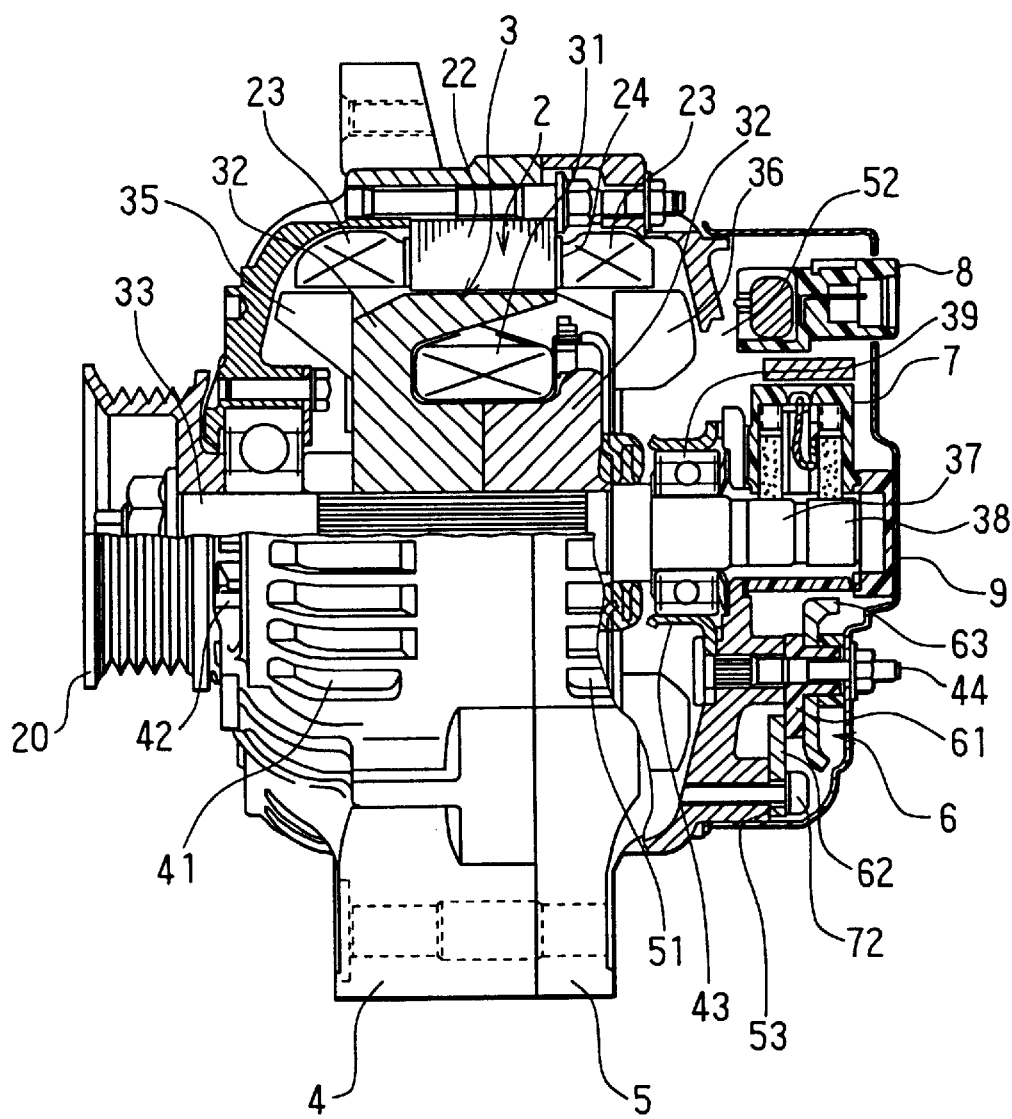
FIG. 1 is a cross-sectional side view of a vehicle AC generator according to a first embodiment of the invention.

As shown in FIG. 1, vehicle AC generator 1 includes stator 2, rotor 3, front and rear frames 4, 5, rectifier unit 6, brush unit 7, voltage regulator 8 and rear cover 9.

Stator 2 includes stator core 22, three-phase stator winding 23, and insulators 24.

Rotor 3 includes cylindrical field coil 31, a pair of pole cores 32 each having six claw poles, rotor shaft 33, and a pair of slip rings 37 and 38 carried by rotor shaft 33 to be coupled to brush unit 7. Pulley 20 is carried by the front end of rotor shaft 33. Mixed-flow-type cooling fan 35 is welded to the front end of pole core 32, and centrifugal cooling fan 36 is welded to the rear end of pole core 32.

Front and rear frames 4, 5 accommodate stator 2 therein and rotatably support rotor 3 inside stator 2. Front and rear frames 4, 5 have air discharge windows 41, 51 at the peripheral portions thereof corresponding to coil-ends of stator winding 23 and air intake windows 42, 52 at the axial end portions thereof.

AC generator 1 is rotated by an engine through a belt (not shown) and pulley 20. When field coil 31 is energized, the claw poles of pole cores 32 are excited to supply magnetic field to stator winding 23, thereby generating three-phase AC power, which is converted into DC power by rectifier 6.

Figure 2:
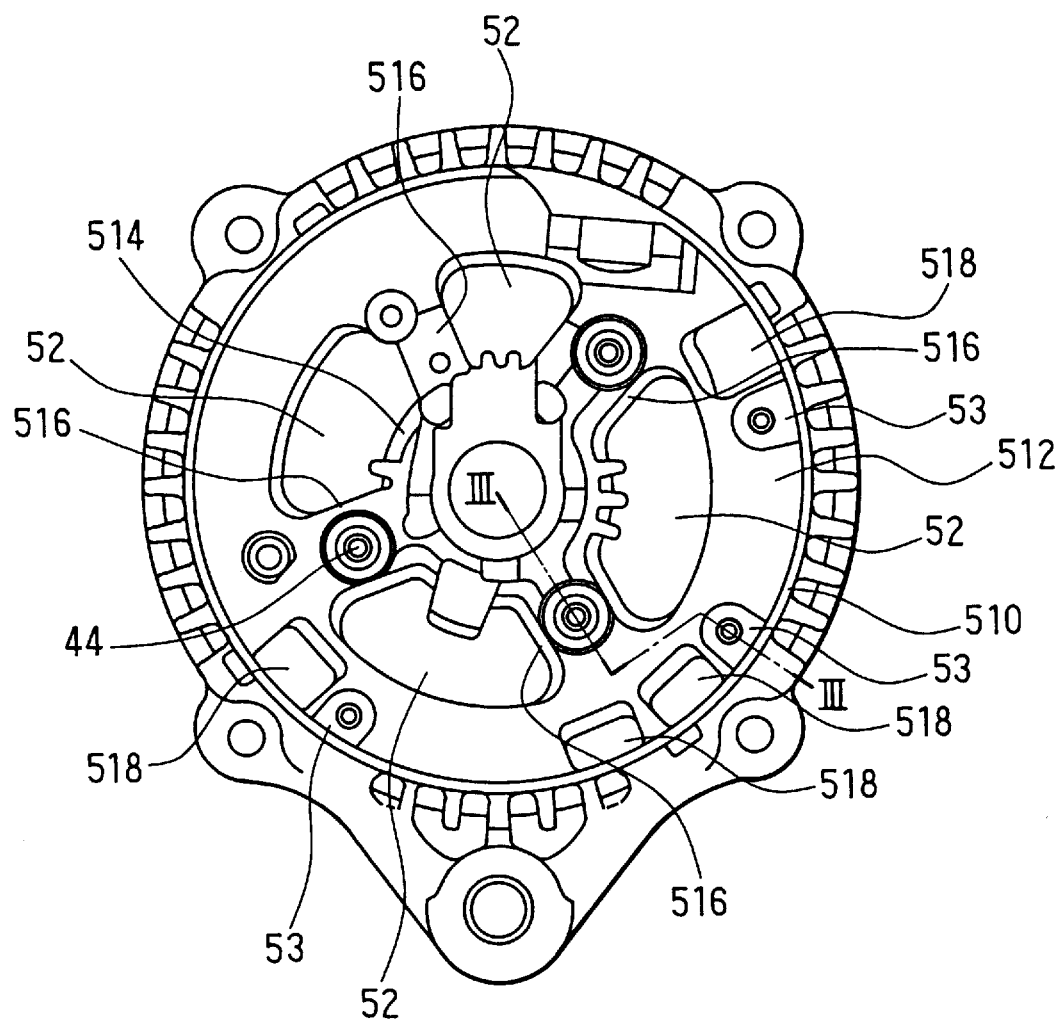
FIG. 2 is a rear view of a rear frame of the AC generator.

As shown in FIG. 2, rear frame 5 has cylindrical outer wall 510, outer ring portion 512, boss portion 514, four ribs 516 connecting ring portion 512 and boss portion 514, and four air intake windows 52 defined by outer ring portion 512, boss portion 514 and ribs 516. Rear frame 5 also has bearing support 43 supporting bearing 39 and three fin supports 53 having female screw 54 at the rear surface thereof.

As shown in FIGS. 3A and 3B, each rib 516 has bolt-through hole 516a, and bearing support 43 is fixed to ribs 516 by three stud bolts 44 which respectively extend through bolt-through holes 516a rearward from rear frame 5. Four small openings 518 are formed circumferentially at outer ring portion 512, and each fin support 53 is formed at the side of small opening 518 remote from rib 516. Accordingly, the heat transferred from negative cooling fin 62 is dissipated before it is transferred to bearing support 43 and bearing 39. Air discharge windows 51 are formed at the peripheral portions of rear frame 5 corresponding to fin supports 53.

Rectifier unit 6 has negative cooling fin 62, positive cooling fin 63, and connection member 61 disposed between two fins 62, 63. Rectifier unit 6 converts three-phase AC power generated by stator winding 23 into DC power.

Figure 5:
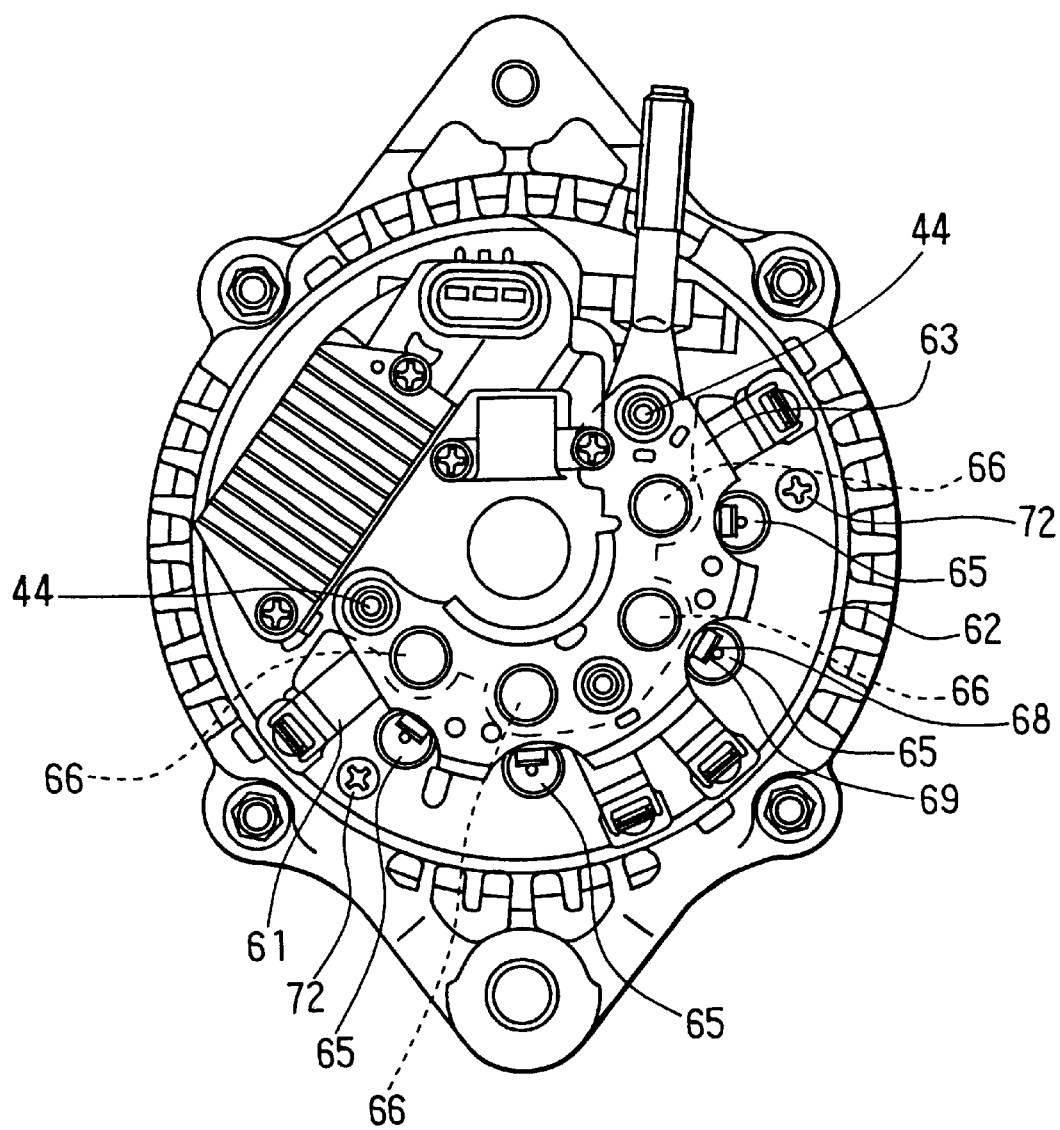
FIG. 5 is a rear view of the AC generator shown in FIG. 1.

As shown in FIGS. 4 and 5, connection member 61 has twelve terminals 691a–694c which extend from four terminal members 691, 692, 693 and 694 and three sleeves 71 through which three stud bolt 44 extend. Terminal member 691 connects the first pair of negative side and positive side diodes 65, 66 respectively by terminals 691a, 691b and the lead from the first phase-winding of stator winding 2 by terminal 691c; terminal member 692 connects the second pair of negative side and positive side diodes 65, 66 respectively by terminals 692a, 692b and the lead from the second phase-winding thereof by terminal 692c; terminal member 693 connects the third pair of negative side and positive side diodes 65, 66 respectively by terminals 693a, 693b and the lead from the third phase-winding thereof by terminal 693c; and terminal member 694 connects the fourth pair of negative side and positive side diodes 65, 66 respectively by terminals 694a, 694b and the lead from the neutral point thereof by terminal 694c.

Negative cooling fin 62 has four negative-side diodes 65 thereon, and positive cooling fin 63 has four positive-side diodes 66 thereon. Negative cooling fin 62 has an arc-shaped outer periphery having approximately the same outside diameter as the inside diameter of rear cover 9 and three through holes 76 through which screw bolts 72 are screwed into female screw 54 of fin supports 53. Four negative-side diodes 65 have one end soldered to negative cooling fin 62 at equal intervals along an arc thereon and lead extending from the other end to be welded to corresponding terminals 69.

As shown in FIG. 5, positive cooling fin 63 has an arc-shaped outer periphery having an outside diameter smaller than the outside diameter of negative cooling fin 62 and larger than the inside diameter of the same. Positive cooling fin 63 also has four positive-side diodes 66 soldered thereto at one end at equal intervals along an arc and three through holes 63a. Each of four positive-side diodes 66 has a lead axially extending to be welded to one of corresponding terminals 69. Positive cooling fin 63 is rivetted, together with insulation spacers 64, to connection member 61 by three pipe rivets 67, which are respectively inserted into sleeves 71 of connection member 61.

Positive cooling fin 64 is disposed at the rear side of negative cooling fin 63 and partly overlaps therewith in the radial direction to provide as much cooling surface area as possible as best shown in FIG. 1. Positive cooling fin 63 has three through holes 63a in which sleeves 71 are respectively fitted as best shown in FIG. 3B.

Figure 6:
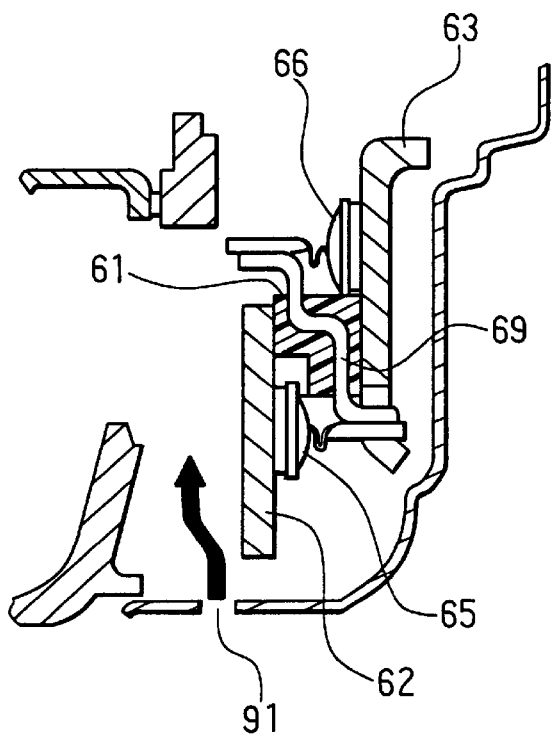
FIG. 6 is a schematic diagram illustrating cooling air flow inside a rear cover of the AC generator.

As shown in FIG. 6, rear cover 9 is fixed to rear frame 5 to cover rectifier unit 6, brush unit 7 and voltage regulator 8. Rear cover 9 has a rear wall in which a plurality of central air intake windows (not shown) are formed at the radially central portion thereof and a cylindrical wall in which a plurality of peripheral air intake windows 91 are formed. Accordingly, positive cooling fin 63 is cooled by the cooling air taken from the central air intake windows, and negative cooling fin 62 is mainly cooled by the cooling air, which is indicated by an arrow, taken from the peripheral cooling windows as shown in FIG. 6.

Figure 7:
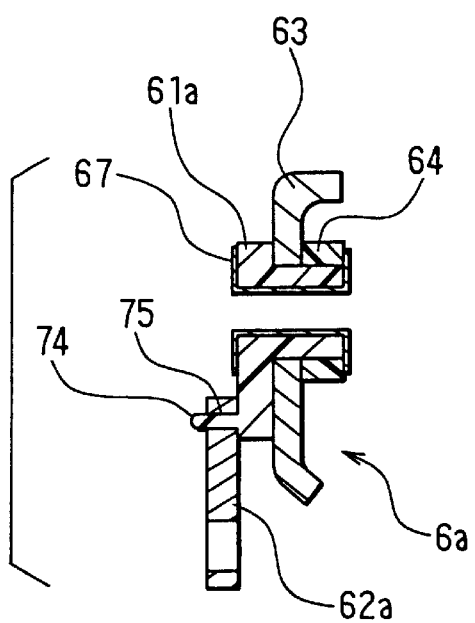
FIG. 7 is a variation of a rectifier unit of the AC generator according to first embodiment of the invention.
Figure 8:
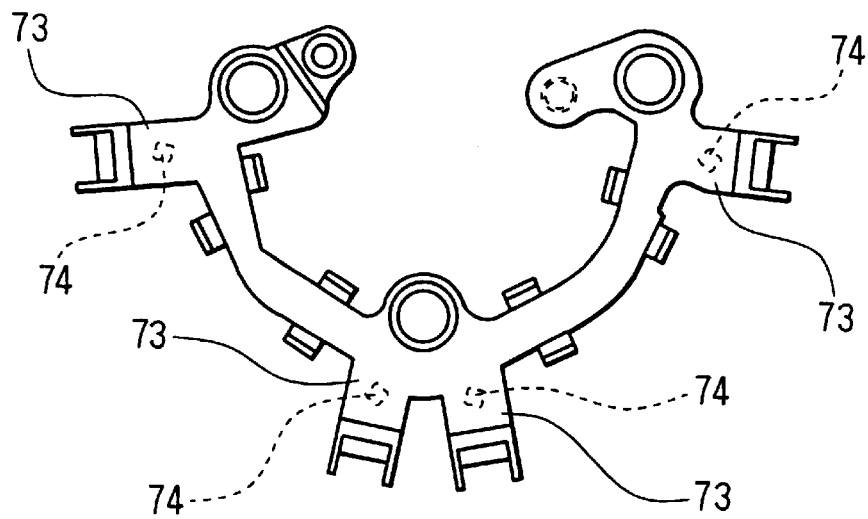
FIG. 8 is a connection member of the variation of the rectifier unit shown in FIG. 7.
Figure 9:
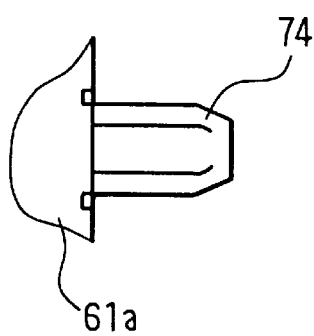
FIG. 9 is a fragmentary side view of a projection of the connection member shown in FIG. 8.
Figure 11:
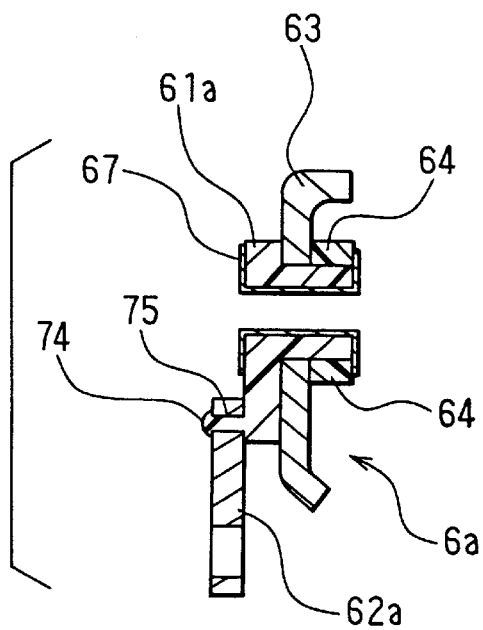
FIG. 11 is another variation of the rectifier unit of the AC generator according to the first embodiment of the invention.
Figure 10:
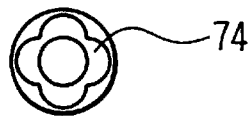
FIG. 10 is a fragmentary side view of the projection of the connection member shown in FIG. 8.

As shown in FIGS. 7 and 8, rectifier unit 6 can have connection member 61a which has four projections 74 and negative cooling fin 62a which has corresponding four holes 75. Four projections extend from arm portions 73 of connection member 61a respectively into four holes 75 of negative cooling fin 62a. Each of projections 74 has an outside diameter slightly larger than the inside diameter of holes 75 so that projections 74 can be press-fitted into apertures 75 and deformed plastically. As illustrated in FIGS. 9 and 10, projection 74 has a deformable salient surface when it is press-fitted into hole 75. The head of projection 74 can be deformed by heating or in a different way as illustrated in FIG. 11.

As shown in FIGS. 12A and 12B, rectifier unit 6 can have negative and positive fins 162 and 163 on the same surface of connection member 161. Negative cooling fin 162 is directly fixed to rear frame 5 in the same manner as the above described embodiment. Rectifier unit 6 also can have negative and positive fins 262 and 263 on the same surface of connection member 261 as shown in FIGS. 13A and 13B. Negative cooling fin 162 is fixed to rear frame 5 via connection member 261. These variation also provide substantially the same cooling effect, thereby increasing the life of the bearing.

In the foregoing description of the present invention, the invention has been disclosed with reference to specific embodiments thereof. It will, however, be evident that various modifications and changes may be made to the specific embodiments of the present invention without departing from the broader spirit and scope of the invention as set forth in the appended claims. Accordingly, the description of the present invention in this document is to be regarded in an illustrative, rather than restrictive, sense.

What is claimed is:

1. A vehicle AC generator comprising:
    a pair of front and rear frames including a pair of front and rear bearing supports and bearings respectively disposed in said bearing supports;
    a stator having a multi-phase armature winding supported by said pair of frames;
    a rotor disposed inside said stator and having a shaft rotatably supported by said pair of frames via said bearings;
    a rectifier unit having a positive cooling fin holding a plurality of positive diodes and a negative cooling fin holding a plurality of negative diodes, said positive cooling fin being fastened by a plurality of first bolts together with said rear frame and said rear bearing support separate from said negative cooling fin; and
    a connection member disposed between said positive cooling fin and said negative cooling fin to insulate and hold the same, said connection member having a circuit electrically connecting said armature winding and said rectifier unit and an insulation cover.

2. The AC generator as claimed in claim 1, wherein said negative cooling fin is fastened to said rear frame by a plurality of second bolts radially spaced from said positive cooling fin.

3. The AC generator as claimed in claim 1, wherein said positive and negative cooling fins are disposed to partly overlap with each other in the a radial direction.

4. The AC generator as claimed in claim 3, said plurality of positive diodes and said plurality of negative diodes are disposed to be opposite to one another.

5. The AC generator as claimed in claim 4, wherein said negative cooling fin has a hole, and said connection member has a projection fitted into said hole.

6. The AC generator as claimed in claim 5, wherein said projection has a head which is heat-deformed to fix said negative cooling fin.

7. The AC generator as claimed in claim 5, wherein said projection comprises a columnar member having an outside diameter suitable to be press-fitted into said hole.

8. The AC generator as claimed in claim 7, wherein said positive cooling fin and said connection member are fixed by a plurality of pipe rivets.

\* \* \* \* \*